United States Patent
Skovira

(10) Patent No.: US 6,625,636 B1
(45) Date of Patent: Sep. 23, 2003

(54) JOB PROTECTION WITHIN A DISTRIBUTED PROCESSING SYSTEM HAVING SUBSYSTEM DOWNTIME

(75) Inventor: Joseph Francis Skovira, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/311,778

(22) Filed: May 13, 1999

(51) Int. Cl.$^7$ .......................... G06F 9/00; G06F 15/173
(52) U.S. Cl. .................... 709/102; 709/100; 709/103; 709/223; 709/200
(58) Field of Search ................ 709/100, 102, 709/103, 105, 223; 711/158; 700/100

(56) References Cited

U.S. PATENT DOCUMENTS

| | | | | |
|---|---|---|---|---|
| 4,800,488 A | * | 1/1989 | Agrawal et al. ............ | 709/102 |
| 4,885,684 A | | 12/1989 | Austin et al. ................ | 364/300 |
| 4,937,743 A | * | 6/1990 | Rassman et al. ............ | 705/8 |
| 5,040,123 A | * | 8/1991 | Barber et al. ................ | 700/100 |
| 5,093,794 A | * | 3/1992 | Howie et al. ................ | 700/100 |
| 5,212,791 A | | 5/1993 | Damian et al. .............. | 395/650 |
| 5,666,538 A | * | 9/1997 | DeNicola .................... | 709/217 |
| 5,790,431 A | * | 8/1998 | Ahrens et al. ............... | 709/104 |
| 6,223,204 B1 | * | 4/2001 | Tucker ........................ | 700/102 |
| 6,389,454 B1 | * | 5/2002 | Ralston et al. ............... | 711/111 |

\* cited by examiner

*Primary Examiner*—David Wiley
*Assistant Examiner*—Joseph E Avellino
(74) *Attorney, Agent, or Firm*—Lawrence Cutter, Esq.; Floyd Gonzalez, Esq.; Heslin Rothenberg Farley & Mesiti P.C.

(57) ABSTRACT

A job scheduler module for a distributed processing system is provided with capability to protect jobs from planned or unplanned subsystem downtimes. The approach includes determining a downtime for a subsystem of the distributed processing system, determining at least one of a start time and an end time of a job to be executed using the subsystem, determining whether the start time or the end time of the job is within the downtime, and if not, placing the job in an eligible job list. The scheduler then makes a decision whether to start the job using the eligible job list. A downtime protection flag can be associated with each job, thereby allowing a user to indicate whether the job is to receive subsystem downtime protection. If not, then the job is placed directly in the eligible job list for scheduler execution irrespective of subsystem downtime.

19 Claims, 3 Drawing Sheets

```
READ THE DOWNTIME FILE

FOR EACH SUB-SYSTEM WITH A DOWNTIME ENTRY

FOR EACH JOB

IF THE JOB HAS THE SUB-SYSTEM PROTECTION FLAG SET
            ASSUME THAT THE JOB START TIME = NOW
            COMPUTE END TIME IF JOB WERE TO BEGIN IMMEDIATELY

IF STARTTIME OR ENDTIME OF JOB IS WITHIN DOWNTIME,
                DO NOT PLACE THE JOB ON THE ELIGIBLE LIST
            ELSE
                PLACE THE JOB ON THE ELIGIBLE LIST
            ENDIF

ELSE THE JOB HAS NONPROTECT FOR THIS RESOURCE
            PLACE THE JOB ON THE ELIGIBLE LIST

ENDIF /* END OF THE CHECK FOR PROTECTION FLAG */

ENDFOR /* END OF THE FOR LOOP ON ALL THE JOBS */

ENDFOR /* END OF THE FOR LOOP ON ALL DOWNTIME ENTRIES */
``` fig. 3

JOB PROTECTION WITHIN A DISTRIBUTED PROCESSING SYSTEM HAVING SUBSYSTEM DOWNTIME

TECHNICAL FIELD

This Invention broadly relates to data processing techniques, and more particularly, to a technique for job scheduling within a distributed processing system having one or more subsystems with scheduled or unscheduled

BACKGROUND OF THE INVENTION

Downtime for maintenance of a subsystem is usually a necessary part of any computer system operation. A job scheduling system typical oversees and is an integral part of this downtime maintenance. Conventionally, shutting down the job scheduling system prevents further jobs from being started while the system is undergoing maintenance. One problem, however, which is particularly relevant in a distributed processing system, is that jobs might have already been started whose execution will extend into a scheduled downtime of a needed subsystem. These jobs might start, according to normal schedule or operation, hours before the subsystem's downtime begins. However, once the downtime begins, any remaining jobs would normally be canceled by a system administrator.

Thus, an automated processing technique is needed for a job scheduler to determine whether a job to execute within a parallel processing system should be commenced notwithstanding a scheduled or unscheduled downtime of one or more subsystems required by the job.

DISCLOSURE OF THE INVENTION

One approach to downtime job protection is to simply prevent jobs from starting as the jobs approach the downtime. This concept, however, has several disadvantages. First, certain users, i.e., those with application level checkpointing in their parallel job, will want to run their job even if the tail end of the code is scheduled to finish within the downtime. With application level checkpointing, running for a few hours before a scheduled downtime provides the user with an opportunity to obtain earlier results since the checkpointing allows restarting of the job essentially where it left off. Another disadvantage of simply preventing jobs from starting as they approach the downtime, is that different subsystems, such as a batch scheduler, parallel file system and high performance storage system, within a distributed processing system may experience independent downtimes. Simply waiting for a downtime of one of these subsystems would not protect the jobs from downtimes in the other subsystems. In view of these disadvantages, a different approach to downtime protection than simply preventing all jobs from starting is needed and is provided by the present invention.

Briefly summarized, the invention comprises in one aspect a method for processing jobs within a distributed processing system. The method includes: determining that a subsystem of the distributed processing system has a downtime; determining at least one of a start time and an end time of a job to be executed using the subsystem; determining whether the start time or the end time of the job is within the scheduled downtime, and if not, placing job in an eligible job list; and making a decision whether to start the job using the eligible job list.

In another aspect, the invention comprises a system for processing jobs within a distributed processing system. This system includes a scheduler module for controlling scheduling of a job for execution within the distributed processing system. The scheduler module includes computer code for: determining a downtime for a subsystem of the distributed processing system; determining at least one of a start time and an end time of a job to be executed using the subsystem; determining whether the start time or the end time of the job is within the downtime, and if not, placing the job in an eligible job list; and making a decision whether to start the job using the eligible job list.

In a further aspect, an article of manufacture is provided which includes a computer program product comprising computer usable medium having computer readable program code means therein for use in processing jobs within a distributed processing system. The computer readable program code means in the computer program product includes: computer readable program code means for causing a computer to effect determining a.downtime for a subsystem of the distributed processing system; computer readable program code means for causing a computer to effect determining at least one of a start time and an end time for a job to be executed using the subsystem; computer readable program code means for causing a computer to effect determining whether the start time or the end time of the job is within the downtime, and if not, for placing the job in an eligible job list; and computer readable program code means for causing a computer to effect making a decision whether to start the job using the eligible job list.

To restate, using the components of the present invention, different downtimes can be designated for different subsystems of a distributed processing system, at the discretion of a system administrator. As downtimes approach, jobs begin to be excluded from scheduling consideration since, if started, they will run into the downtime of a needed subsystem. As the downtime starts, the only jobs remaining running on the system are those to whom the downtime is unimportant, either because they are taking advantage of application level checkpointing or because they don't use the subsystem which is being stopped. Thus, jobs no longer have to be terminated once a subsystem downtime begins only to be restarted after the downtime ends. Users can elect whether to use the time prior to a scheduled downtime to initiate a job, and the existence of a downtime is no longer an all-or-nothing event. Individual subsystems can be selected for downtimes leaving the remaining system resources available for jobs which can put them to use. Site-specific downtime protection for local subsystems can also be implemented.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 3 is pseudocode for implementing one embodiment of downtime protection in accordance with the principles of the present invention.

BEST MODE FOR CARRYING OUT THE INVENTION

Figure 1:
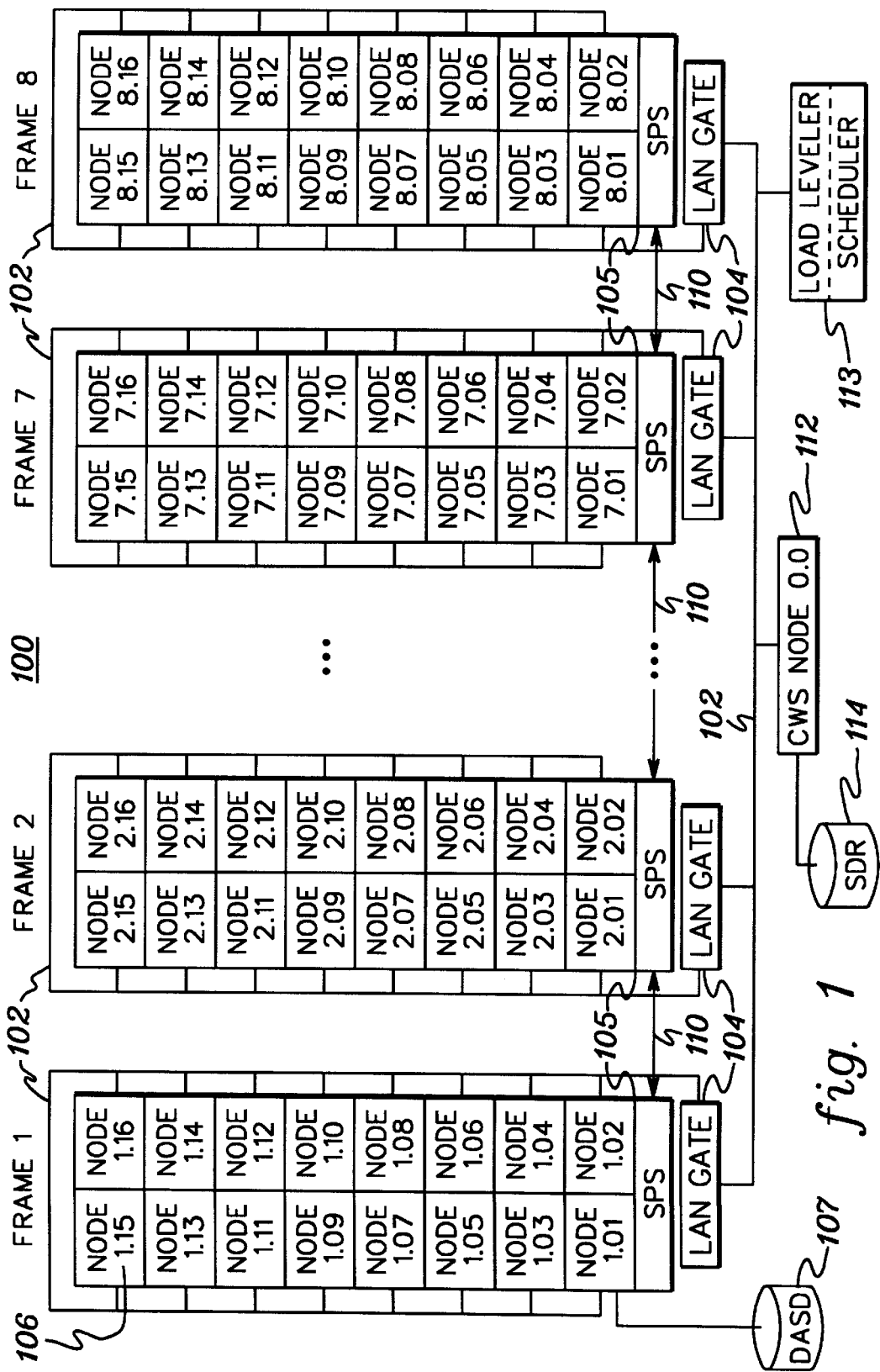
FIG. 1 is a schematic diagram of a distributed data processing system to employ the downtime protection capabilities of the present invention.

FIG. 1 is a schematic diagram of a distributed computer system 100 useable with the present invention. The distributed computer system 100 may be an IBM RISC System/ 6000 Scalable POWERparallel Systems (SP) distributed computer system available from International Business Machines Corporation of Armonk, N.Y. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well-known by those skilled in the art.

All of the nodes in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 referred to as the System Shared Disk on which is stored the system data repository (SDR) files. The SDR files include such information as a list of nodes that are in the system and their configuration, and includes resources and object definitions for each of the nodes 106. Each node 106 also includes a DASD device 107 for storing data processed by the SP computer 100.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As is well understood in the art, the CWS node 112 sends system data and control signals to the frames of the SP computer 100 by means of the LAN 102 while messages and data may be sent from one to another of the nodes 106 by means of the high performance switches 105.

Also shown in FIG. 1 is an internal task or job scheduler such as the IBM Load Leveler Parallel Batch Scheduler, along with an external scheduler (separated by a phantom line) and together labeled 113. The Load Leveler Parallel Batch Scheduler is a commercially available product marketed by IBM, and although shown as a discrete block in FIG. 1, actually is a distributed scheduler residing on each node of the distributed processing system. In addition to being a batch system control, the Load Leveler program is also a job scheduler. However, in accordance with the principles of the present invention, an external job scheduler is coupled to the distributed system for administrator control of job processing. Examples of such an external scheduler exist in the art. For example, reference the Easy-II Parallel Job Scheduler which is publically available at Web Page: http://www.tc.cornell.edu. Another example of an external job scheduler commercially available is the Maui External Scheduler supported by Maui High Performance Computing Center of Maui, Hawaii. In accordance with one embodiment of the present invention, the program code disclosed herein is an enhancement to an external job scheduler such as the Easy-II or Maui Schedulers, which are provided herein by way of example only.

Generally, in a distributed processing system such as depicted in FIG. 1, there will be a long list of jobs or tasks waiting to run on the system. If a job commences that requires a subsystem currently not available, or which becomes unavailable while the job is executing, the job conventionally fails. This is a problem since the job may have been in the job queue for a number of days before finally failing due to scheduled unavailability of a subsystem required by the job. Thus, presented herein is a technique for identifying when subsystems will be down either from a planned event such as a scheduled servicing, or an unplanned event, such as a subsystem failure. The present invention comprises a technique to allow jobs to become aware through the external scheduler when a downtime exists or is planned to exist. The scheduler has a list of subsystem downtimes as well as which jobs will be effected by downing of particular subsystems. By way of further explanation, consider the following examples.

Format of downtime record:
   # Type of Down=Start of Down End of Down
     # batch,hpss,piofs=month/day/year-hour:minute, month/day/year-hour:minute
Number of characters in fields:
   # mm/dd/yy-hh:mm, mm/dd/yy-hh:mm
Examples:
   # batch=10/1/98-7:00, 10/1/98-10:00 a 7–10 AM batch down on 10/1/98
   # piofs=10/1/98-7:00, 10/1/98-14:00 a 7AM–2PM piofs down on 10/1/98
   # hpss=10/2/98-8:00 An open-ended 8 AM hpss down on 10/2/98
   hpss=3/4/98-15:00, 3/5/98-14:00
   piofs=2/4/98-8:00, 2/4/98-8:55
   batch=2/4/98-8:00, 2/4/98-8:55
Wherein # denotes comment.

The above example presents a file format for the downtime file. Within this file, three different subsystems are depicted for protection. These include the batch scheduling system (batch), the parallel file system (piofs), and the high performance storage system (hpss). Also, within the downtime file the first day and time represents a downtime start and the second day and time represents the downtime end. At any point, the system administrator of a UNIX or AIX system could create a downtime file such as depicted above. The file is periodically examined by the external scheduler, for example, every 30 seconds, to obtain the latest downtime information.

Generally stated, within the downtime file, the start and, optionally, the end times of any administrator subsystem downtime can be recorded. If the end time is excluded, the downtime is open-ended and will only close when the administrator either adds a correct end time for the down or removes the downtime file. A keyword is also included with each record to indicate which subsystem will be experiencing the outage. Along with developing a downtime file, a utility is also preferred to periodically check the downtime file for correct syntax of the downtime records.

Figure 2:
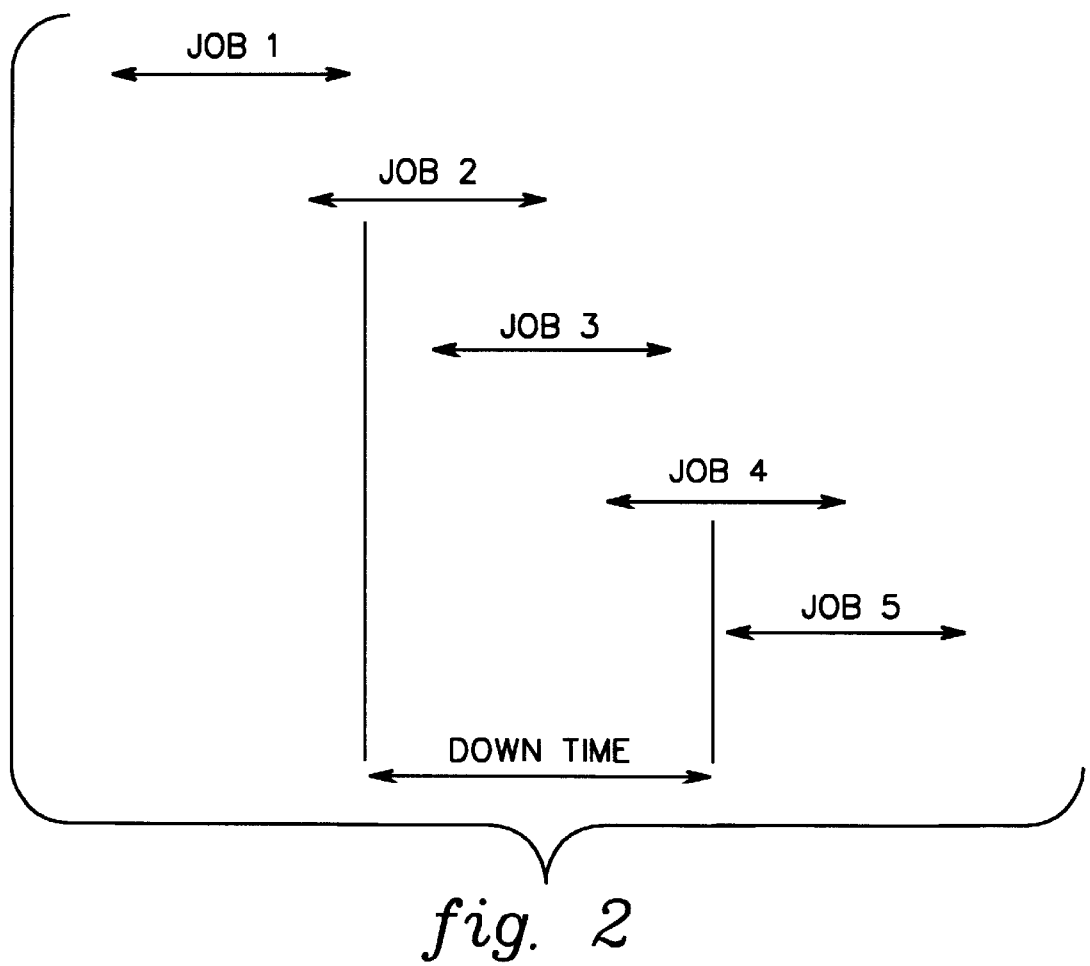
FIG. 2 is a timing diagram useful in explaining downtime protection in accordance with the principles of the present invention.

FIG. 2 depicts five different jobs to be executed, along with a scheduled subsystem downtime. Job 1 is executed since its start and end times are prior to the start of the subsystem downtime. Job 2 commences before the scheduled downtime but extends into the subsystem downtime, and would therefore be conventionally canceled by the distributed processing system for restarting after the downtime. Jobs 3 and 4 are to begin within the scheduled downtime and will thus be canceled due to unavailability of the subsystem. Job 5 can be run since its start and end times are again outside of the scheduled subsystem downtime.

As the complication, not all users care whether their job is canceled when the subsystem downtime occurs. For example, in case of job 2 of FIG. 2, there may be 20 hours needed to run the program but only 6 hours available before the scheduled downtime. If, however, job 2 is checkpointing, which as understood by those skilled in the art means that data is being stored periodically, the job can start executing before the scheduled downtime and continue executing where left off after the scheduled downtime. Therefore, in accordance with the principles of the present invention, a user is given the option of whether to specify protection for a particular job in view of a subsystem downtime.

For example, flags can be added to the resources already available to the users which takes the form of protect__subsystem or non-protect__subsystem. If the user adds a non-protect flag for a particular subsystem, the job is allowed to execute into an associated subsystem downtime. If the Protect flag is Issued, the job will be protected from running into the associated downtime or starting during a downtime. By way of example, the protection flags can be entered on the comment line in the Load Leveler job command file, just as other selectable resources are defined. Once the flags are in place, the external scheduler code scans the flags in implementing the logic flow of the present invention. One example of which is depicted in FIG. 3.

In the logic of FIG. 3, the downtime file is read and for each subsystem with a downtime entry, each scheduled job is considered as shown. In one example, if subsystems batch, piofs, and hpss each have a downtime entry, then the external scheduler loops through the code of FIG. 3 three times. For each scheduled job, a determination is made whether the job has a protection flag set. Next, the job start time is assumed to be immediate and the end time is computed. If either the start time or the end time of the job is within the scheduled downtime, the job is not placed on the eligible job list (i.e., assuming that the job protection flag is set). Otherwise, the job is placed on the eligible job list. Further, if the protect flag is not set, then the job is placed on the eligible job list irrespective of any scheduled downtime. As used herein, the "eligible job list" refers to a list of jobs that are eligible to be started by the scheduler., Once the eligible job list is complete, the scheduler makes a start decision whether to currently start a job.

To again summarize, using the components of the present invention, different downtimes can be designated for different subsystems of a distributed processing system, at the discretion of a system administrator. As downtimes approach, jobs begin to be excluded from scheduling consideration since, if started, they will run into the downtime. As the downtime starts, the only jobs remaining running on the system are those to whom the downtime is unimportant, either because they are taking advantage of application level checkpointing or because they don't use the subsystem which is being stopped.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for processing computer jobs within a distributed processing computer system, said method comprising:
    (i) automatically determining a downtime for a subsystem of said distributed processing computer system, wherein during said downtime, said subsystem is unavailable;
    (ii) determining at least one of a start time and an end time of a computer job to be executed at least in part using said subsystem;
    (iii) determining whether said start time or said end time of said computer job is within said downtime, and if not, placing said computer job in an eligible job list;
    (iv) making a decision whether to start said computer job using said eligible job list; and
    (v) further comprising indicating whether said computer job is to receive downtime protection, and if so, performing said determining (ii) and said determining (iii) for said computer job.

2. The method of claim 1, further comprising implementing said method from an external parallel job scheduler.

3. The method of claim 1, wherein said indicating comprises setting a flag associated with said job when said job is to receive subsystem downtime protection by performing said determining (ii) and said determining (iii) for said job.

4. The method of claim 1, wherein said automatically determining (i) comprises reading a downtime file identifying said subsystem with a downtime entry, and wherein said method comprises for each job of a plurality of jobs to be processed within said distributed processing system, repeating said determining (ii), said determining (iii) and said making (iv).

5. The method of claim 1, wherein said determining (ii) comprises assuming that said job has an immediate start time and computing an end time therefor from said immediate start time.

6. The method of claim 1, wherein said subsystem comprises at least one of a batch scheduling system, a parallel file system, and a mass storage system.

7. The method of claim 1, wherein the determining (i) occurs without suspending operation of said distributed processing computer system.

8. The method of claim 1, wherein the determining (i) comprises dynamically determining the downtime for the subsystem while processing computer jobs within the distributed processing computer system.

9. A system for processing jobs within a distributed processing computer system, said system comprising:
    a scheduler module for controlling scheduling of a computer job for execution within said distributed processing computer system, said scheduler module comprising computer code for:
        (i) automatically determining a downtime for a subsystem of said distributed processing computer system, wherein during said downtime, said subsystem is unavailable;
        (ii) determining at least one of a start time and an end time of a computer job to be executed at least in part using said subsystem;
        (iii) determining whether said start time or said end time of said computer job is within said downtime, and if not, placing said computer job in an eligible job list; and (iv) making a decision whether to start said computer job using said eligible job list; and wherein said scheduler module is further adapted to indicate whether said computer job is to receive downtime protection, and if so, to perform said determining (ii) and said determining (iii) for said computer job.

10. The system of claim 9, wherein said scheduler module comprises an external parallel job scheduler coupled to said distributed processing system.

11. The system of claim 9, wherein said indicating of said scheduler module comprises setting a flag associated with said job when said job is to receive subsystem downtime protection by performing said determining (ii) and said determining (iii) for said job.

12. The system of claim 9, wherein said automatically determining (i) comprises reading a downtime file identifying said subsystem with a downtime entry, and wherein said scheduler module of said system comprises for each job of a plurality of jobs to be processed within said distributed processing system, computer code for repeating said determining (ii), said determining (iii) and said making (iv).

13. The system of claim 9, wherein said determining (ii) comprises assuming that said job has an immediate start time and computing an end time therefor from said immediate start time.

14. The system of claim 9, wherein said subsystem comprises at least one of a batch scheduling system, a parallel file system, and a mass storage system.

15. A system for processing computer jobs within a distributed processing computer system, said system comprising:

(i) means for automatically determining a downtime for a subsystem of said distributed processing computer system, wherein during said downtime, said subsystem is unavailable;

(ii) means for determining at least one of a start time and an end time of a computer job to be executed using said subsystem;

(iii) means for determining whether said start time or said end time of said computer job is within said downtime, and if not, for placing said computer job in an eligible job list;

(iv) means for making a decision whether to start said computer job using said eligible job list; and (v) means for indicating whether said computer job is to receive downtime protection, and if so, for performing said means for determining (ii) and said means for determining (iii) for said computer job.

16. An article of manufacture comprising:

a computer program product comprising computer usable medium having computer readable program code means therein for use in processing computer jobs within a distributed processing computer system, said computer readable program code means in said computer program product comprising:

computer readable program code means for causing a computer to automatically effect determining a downtime for a subsystem of said distributed processing computer system, wherein during said downtime, said subsystem is unavailable;

computer readable program code means for causing a computer to effect determining at least one of a start time and an end time for a computer job to be executed using said subsystem;

computer readable program code means for causing a computer to effect determining whether said start time or said end time of said computer job is within said downtime, and if not, placing said computer job in an eligible job list;

computer readable program code means for causing a computer to effect making a decision whether to start said computer job using said eligible job; and computer readable program code means for causing a computer to effect indicating whether said computer job is to receive downtime protection, and if so, performing said determining at least one of said start time and end time for said computer job and said determining whether said start time or end time of said computer job is within said downtime.

17. The article of manufacture of claim 16, wherein said article of manufacture resides within an external parallel job scheduler coupled to said distributed processing system.

18. The article of manufacture of claim 16, wherein said computer readable program code means for causing a computer to effect indicating comprises computer readable program code means for causing a computer to effect setting a flag associated with said job when said job is to receive subsystem downtime protection via said determining at least one of the start time and the end time for said job and said determining whether said start time or said end time of said job is within said downtime.

19. The article of manufacture of claim 16, wherein said computer readable program code means for causing a computer to effect determining at least one of a start time and an end time for said job comprises computer readable program code means for causing a computer to effect assuming that said job has an immediate start time and computing an end time therefor from said immediate start time.

\* \* \* \* \*

UNITED STATES PATENT AND TRADEMARK OFFICE
CERTIFICATE OF CORRECTION

PATENT NO.     : 6,625,636 B1
DATED          : September 23, 2003
INVENTOR(S)    : Skovirn It is certified that error appears in the above-identified patent and that said Letters Patent is hereby corrected as shown below:

<u>Column 1,</u>
Line 11, at the end of the sentence, insert -- downtime(s). --

Signed and Sealed this

Fourth Day of May, 2004

JON W. DUDAS
*Acting Director of the United States Patent and Trademark Office*